United States Patent
Matsuyama et al.

(10) Patent No.: US 11,819,930 B2
(45) Date of Patent: Nov. 21, 2023

(54) MATERIAL FOR BUILT-UP EDGE FORMATION AND BUILT-UP EDGE FORMATION METHOD

(71) Applicant: Mitsubishi Gas Chemical Company, Inc., Tokyo (JP)

(72) Inventors: Yousuke Matsuyama, Yonezawa (JP); Shigeru Horie, Tokyo (JP)

(73) Assignee: Mitsubishi Gas Chemical Company, Inc., Tokyo (JP)

(*) Notice: Subject to any disclaimer, the term of this patent is extended or adjusted under 35 U.S.C. 154(b) by 1181 days.

(21) Appl. No.: 16/349,466

(22) PCT Filed: Oct. 31, 2017

(86) PCT No.: PCT/JP2017/039226
§ 371 (c)(1),
(2) Date: May 13, 2019

(87) PCT Pub. No.: WO2018/088267
PCT Pub. Date: May 17, 2018

(65) Prior Publication Data
US 2020/0189009 A1    Jun. 18, 2020

(30) Foreign Application Priority Data
Nov. 14, 2016   (JP) .................... 2016-221942

(51) Int. Cl.
*B23C 5/28* (2006.01)
*B23B 51/06* (2006.01)
*B23B 35/00* (2006.01)

(52) U.S. Cl.
CPC .............. *B23B 35/00* (2013.01); *B23B 51/06* (2013.01); *B23B 2226/275* (2013.01);
(Continued)

(58) Field of Classification Search
CPC .............. B23B 35/00; B23B 2226/275; B23B 2226/61; B23B 2228/52; B23B 51/06; B23C 5/28; B23C 2226/27; B23C 2226/61

See application file for complete search history.

(56) References Cited

U.S. PATENT DOCUMENTS 2,392,481 A    1/1946 Kaplan et al.
3,220,893 A    11/1965 Blackwood et al.
(Continued)

FOREIGN PATENT DOCUMENTS

CN    1532304 A  *  9/2004
CN    102504909 A    6/2012
(Continued)

OTHER PUBLICATIONS https://www.sigmaaldrich.com/catalog/product/aldrich/808113?lang=en&region=US (Year: 2018).
(Continued)

*Primary Examiner* — Eric A. Gates
(74) *Attorney, Agent, or Firm* — Fitch, Even, Tabin & Flannery LLP

(57) ABSTRACT

The present invention provides a material for built up edge formation having a resin block containing a high molecular weight compound having a weight average molecular weight of $5 \times 10^4$ or higher and $1 \times 10^6$ or lower, a medium molecular weight compound having a weight average molecular weight of $1 \times 10^3$ or higher and lower than $5 \times 10^4$, and a carbon.

11 Claims, 4 Drawing Sheets

(52) U.S. Cl.
CPC ....... *B23B 2226/61* (2013.01); *B23B 2228/52* (2013.01); *B23C 5/28* (2013.01); *B23C 2226/27* (2013.01); *B23C 2226/61* (2013.01)

(56) References Cited

U.S. PATENT DOCUMENTS

| | | | |
|---|---|---|---|
| 4,052,323 | A | 10/1977 | Feneberger et al. |
| 4,519,732 | A | 5/1985 | Sutcliffe |
| 4,572,714 | A | 2/1986 | Suzuki et al. |
| 4,990,035 | A | 2/1991 | Scheuch et al. |
| 5,026,612 | A | 6/1991 | Selwood et al. |
| 5,082,402 | A | 1/1992 | Gaku et al. |
| 5,492,639 | A | 2/1996 | Schneider et al. |
| 5,507,603 | A | 4/1996 | Nakano et al. |
| 5,816,755 | A | 10/1998 | Thelin |
| 5,909,985 | A | 6/1999 | Shiga et al. |
| 6,164,876 | A | 12/2000 | Cordovano |
| 10,328,494 | B2 * | 6/2019 | Fu ........................... B23B 27/14 |
| 10,384,322 | B2 | 8/2019 | Matsuyama et al. |
| 10,518,341 | B2 | 12/2019 | Matsuyama et al. |
| 2002/0037400 | A1 | 3/2002 | Fujiwara et al. |
| 2002/0051684 | A1 | 5/2002 | Eziri et al. |
| 2002/0170178 | A1 | 11/2002 | Zackrisson et al. |
| 2003/0100456 | A1 | 5/2003 | Hasaki et al. |
| 2003/0152432 | A1 | 8/2003 | Meece et al. |
| 2004/0023059 | A1 | 2/2004 | Kaburagi et al. |
| 2004/0191016 | A1 | 9/2004 | Hintze et al. |
| 2005/0003169 | A1 | 1/2005 | Ikeguchi et al. |
| 2005/0123363 | A1 | 6/2005 | Ahrnkiel et al. |
| 2007/0127997 | A1 | 6/2007 | Muselli et al. |
| 2008/0170917 | A1 | 7/2008 | Hilker |
| 2010/0028671 | A1 | 2/2010 | Mitsui et al. |
| 2010/0054871 | A1 | 3/2010 | Prakash |
| 2010/0172708 | A1 | 7/2010 | Bolin et al. |
| 2012/0020749 | A1 | 1/2012 | Maeda et al. |
| 2012/0039680 | A1 | 2/2012 | Koike et al. |
| 2012/0051863 | A1 | 3/2012 | Craig et al. |
| 2012/0219371 | A1 | 8/2012 | Craig |
| 2012/0282044 | A1 | 11/2012 | Volokh et al. |
| 2012/0294689 | A1 | 11/2012 | Yagista |
| 2012/0315547 | A1 | 12/2012 | Itoh et al. |
| 2013/0017025 | A1 | 1/2013 | Azegami |
| 2013/0020735 | A1 | 1/2013 | Hintze et al. |
| 2013/0170920 | A1 | 7/2013 | Ogawa |
| 2013/0209184 | A1 | 8/2013 | Barry et al. |
| 2013/0209190 | A1 | 8/2013 | Oode et al. |
| 2014/0260884 | A1 | 9/2014 | Hsieh |
| 2015/0072122 | A1 | 3/2015 | Kamei et al. |
| 2015/0111049 | A1 | 4/2015 | Matsuyama et al. |
| 2015/0125228 | A1 | 5/2015 | Sugimoto et al. |
| 2015/0298355 | A1 | 10/2015 | Ohlendorf |
| 2016/0045961 | A1 | 2/2016 | Umehara et al. |
| 2017/0009171 | A1 | 1/2017 | Soto-Castillo et al. |
| 2017/0100781 | A1 | 4/2017 | Zhang et al. |
| 2017/0106606 | A1 | 4/2017 | Toyozumi et al. |
| 2017/0111997 | A1 | 4/2017 | Matsuyama et al. |
| 2017/0274461 | A1 | 9/2017 | Mabuchi et al. |
| 2018/0229339 | A1 | 8/2018 | Matsuyama et al. |

FOREIGN PATENT DOCUMENTS

| | | | | |
|---|---|---|---|---|
| CN | 104203512 | A | | 12/2014 |
| CN | 104245256 | A | | 12/2014 |
| CN | 104321173 | A | | 1/2015 |
| CN | 104797389 | A * | 7/2015 | ............ B23D 61/00 |
| CN | 105073355 | A | | 11/2015 |
| CN | 102728870 | B * | 4/2016 | ........... B23B 51/009 |
| DE | 3531786 | A1 | | 3/1987 |
| EP | 0571352 | A2 | | 11/1993 |
| EP | 0608920 | A1 | | 8/1994 |
| EP | 0642297 | A1 | | 3/1995 |
| EP | 2979832 | A1 | | 2/2016 |
| EP | 3069709 | A1 | | 9/2016 |
| EP | 3333245 | A1 | | 6/2018 |
| EP | 3342517 | A1 | | 7/2018 |
| EP | 3617296 | A1 | | 3/2020 |
| JP | S50-053768 | A | | 5/1975 |
| JP | S56-095991 | A | | 8/1981 |
| JP | 57-107718 | A | | 7/1982 |
| JP | S58-019716 | B2 | | 4/1983 |
| JP | H04-092494 | A | | 3/1992 |
| JP | H05-169400 | A | | 7/1993 |
| JP | H07-11210 | U | | 2/1995 |
| JP | H07-112311 | A | | 5/1995 |
| JP | H10-110183 | A | | 4/1998 |
| JP | H1158882 | A * | 3/1999 | |
| JP | 2000-015624 | A | | 1/2000 |
| JP | 2001-047307 | A | | 2/2001 |
| JP | 2001-098291 | A | | 4/2001 |
| JP | 2001-347602 | A | | 12/2001 |
| JP | 2002-301632 | A | | 10/2002 |
| JP | 2003-136485 | A | | 5/2003 |
| JP | 2003-175412 | A | | 6/2003 |
| JP | 2003-225814 | A | | 8/2003 |
| JP | 2003-301187 | A | | 10/2003 |
| JP | 2004-230470 | A | | 8/2004 |
| JP | 2005-019657 | A | | 1/2005 |
| JP | 2006-150557 | A | | 6/2006 |
| JP | 2006-181657 | A | | 7/2006 |
| JP | 2008-222762 | A | | 9/2008 |
| JP | 2008229839 | A * | 10/2008 | |
| JP | 2011-020248 | A | | 2/2011 |
| JP | 2011-183548 | A | | 9/2011 |
| JP | 2012-178550 | A | | 9/2012 |
| JP | 2012-210689 | A | | 11/2012 |
| JP | 2013-146819 | A | | 8/2013 |
| JP | 2014-019157 | A | | 2/2014 |
| JP | 2015-160275 | A | | 9/2015 |
| KR | 100270173 | B1 | | 11/2000 |
| KR | 100635108 | B1 | | 10/2006 |
| SG | 11201506893 | U | | 9/2015 |
| SG | 11201710736 | A | | 1/2018 |
| TW | 201349966 | A | | 12/2013 |
| WO | 2012/091179 | A1 | | 7/2012 |
| WO | 2013/132837 | A1 | | 9/2013 |
| WO | 2013/141299 | A1 | | 9/2013 |
| WO | 2013/146612 | A1 | | 10/2013 |
| WO | 2014/157570 | A1 | | 10/2014 |
| WO | 2015/152162 | A1 | | 10/2015 |
| WO | 2017/022822 | A1 | | 2/2017 |

OTHER PUBLICATIONS

Zalucha et al., The Chemistry of Structural Adhesives: Epoxy, Urethane, and Acrylic Adhesives, 2007, p. 291 (Year: 2007).

International Search Report for PCT/JP2017/039226, dated Dec. 26, 2017, and English Translation submitted herewith (5 pages).

U.S. Appl. No. 15/756,899, entitled "Entry Sheet for Drilling and Method for Drilling Processing Using Same," filed Mar. 1, 2018, which entered the U.S. national phase from International Application No. PCT/JP2016/075472, filed on Aug. 31, 2016.

U.S. Appl. No. 15/998,976, entitled "Cutting Work Method and Method for Producing Cut Product," filed Aug. 17, 2018, which entered the U.S. national phase from International Application No. PCT/JP2017/005724, filed on Feb. 16, 2017.

U.S. Appl. No. 16/613,681, entitled "Lubricant Material for Assisting Machining Process, Lubricant Sheet for Assisting Machining Process, and Machining Method," filed Nov. 14, 2019, which entered the U.S. national phase from International Application No. PCT/JP2018/019938, filed on May 24, 2018.

* cited by examiner

MATERIAL FOR BUILT-UP EDGE FORMATION AND BUILT-UP EDGE FORMATION METHOD

CROSS-REFERENCE TO RELATED APPLICATIONS

This application is a U.S. national phase application filed under 35 U.S.C. § 371 of International Application Number PCT/JP2017/039226, filed Oct. 31, 2017, designating the United States, which claims priority from Japanese Application Number 2016-221942, filed Nov. 14, 2016.

FIELD OF THE INVENTION

The present invention relates to a material for built up edge formation and a built up edge formation method.

BACKGROUND OF THE INVENTION

Fiber reinforced composite materials typified by fiber reinforced plastics (FRP), in particular, carbon fiber reinforced plastics (CFRP), have large tensile strength and tensile elastic force and small density, as compared with glass fiber reinforced plastics (GFRP), aramid fiber reinforced plastics (AFRP), or stainless steel (SUS), and have therefore tended to be frequently used as outer panels or the like of aircrafts or vehicles in recent years. In this context, CFRP refers to plastics prepared by hot molding or hot press molding one or two or more layers of prepregs containing carbon fiber impregnated with a matrix resin. A material formed from this CFRP is fixed to a structure using a fastening factor such as a bolt or a rivet. Therefore, cutting work, in particular, cutting work to make many holes for passing a fastening factor in CFRP, is necessary for fixing CFRP to a structure such as an aircraft part.

Some techniques have already been proposed in order to obtain high quality holes by the cutting work of CFRP. Examples of such a technique include a method which involves gradually changing the shape of a tool, for example, the curvature of a cutting face or the point angle of a drill (see, for example, Patent Literature 1).

Materials for the bodywork structures (structural materials) of aircrafts are composed mainly of metal materials, most of which are occupied by aluminum alloy. Heat resistant alloy such as titanium alloy or stainless steel is used in a site capable of becoming a higher temperature, for example, a jet exhaust site or the neighborhood of an afterburner, in a bodywork structure. If the speed up of aircrafts will progress in the future, the strength of conventional aluminum alloy will be reduced due to aerodynamic heating. Therefore, it is expected that harder titanium alloy or stainless steel will be used as main structural materials for bodywork structures. These structural materials constituting the bodyworks of aircrafts need to undergo drilling work with a drill for bolting metal materials or a metal material with another structural material such as CFRP.

Some techniques have already been proposed for such drilling work of metals. For example, a titanium alloy material is a difficult-to-cut material and therefore shortens a drill lifespan very much. In response to such a problem, for example, a processing method which involves spraying a cutting oil, and a method which involves changing the shape of a drill to thereby reduce load to the drill and circumvent reduction in the lifespan of the drill are listed (see, for example, Patent Literature 2).

CITATION LIST

Patent Literature

Patent Literature 1: Japanese Patent Laid-Open No. 2012-210689
Patent Literature 2: Japanese Patent Laid-Open No. 2006-150557

SUMMARY OF INVENTION

Cutting work of fiber reinforced composite materials, is typically performed using a drill. In the general drilling with a drill, the drill has an exceedingly short lifespan, and the drill bit suffers abrasion with increase in the number of processed holes, resulting in reduction in the quality of processed holes. Specifically, the processed holes are more likely to have a small inside diameter, and the splintering of carbon fiber (which is a phenomenon in which a part of fiber constituting a fiber reinforced composite material remains as burrs around processed holes without being cut off) occurs easily at the exit portion of drill penetration. Furthermore, peeling between layers of prepregs constituting a fiber reinforced composite material (hereinafter, referred to as "delamination") also occurs easily. In addition, each processed hole has a nonuniform inside diameter due to the abrasion of a drill bit, and delamination may occur from the irregularity of the processed hole. Such a phenomenon is accepted as a serious defect. As mentioned above, the abrasion of a drill bit is likely to cause problems associated with the quality of processed holes. Meanwhile, for example, the production of structures using CFRP for aircrafts particularly requires high quality cutting work. Thus, it is very important to solve the problems described above, such as splintering and delamination.

In the cutting work of CFRP, the problems associated with the quality of processed holes arise more easily as the abrasion of a cutting tool proceeds with cutting resistance increased. Particularly, for example, high strength CFRP intended for aircrafts contains carbon fiber at a high density. Therefore, the frequency of rubbing of carbon fiber by a drill is increased so that the abrasion of the cutting tool proceeds more rapidly. As measures against this, the tool is changed at shorter intervals in order to maintain hole quality. Under present circumstances, the ratio of tooling cost to processing cost is high.

In this respect, as described in Patent Literature 1, improvement in the workability of fiber reinforced composite materials (e.g., CFRP), for which cutting work is difficult, has been studied in terms of tools, but has produced insufficient effects.

The cutting work of metals is typically performed using a drill. Even if a drill dedicated to metals is used, the drill has a short lifespan. In the case of using a general drill, the drill has an exceedingly short lifespan. Furthermore, the drill bit suffers abrasion with increase in the number of processed holes, resulting in reduction in the quality of processed holes. Specifically, the processed holes are more likely to have a small inside diameter, and burrs also occur easily at the exit portion of drill penetration. In addition, the abrasion of the drill may create the space between a metal material and another structural material (e.g., CFRP) to be bolted. Thus, uplift may arise between these structural materials, or scraps may enter the created space. Such a phenomenon is accepted as a serious defect. As mentioned above, the abrasion of a drill bit is likely to cause problems associated with the quality of processed holes. Under these circumstances, for example, the production of structures using titanium alloy materials for aircrafts particularly requires high quality drilling work. Thus, it is very important to solve the problems described above, such as drill lifespans and uplift between a metal material and a different structural material.

In the case of performing the drilling work of metals using a drill, the heat or friction is generated between the rotating drill and a metal and locally elevates the ambient temperature of a processed hole. Thus, when the number of processed holes is large, heat accumulates on the drill and the workpiece material metal with increase in the number of processed holes. Since a metal having low thermal conductivity insufficiently releases heat, the ambient temperature of a processed hole is elevated. In this respect, the metal is softened as its temperature is elevated. Therefore, burrs occur at the exit portion of drill penetration of the processed hole. Also, metal scraps adhere to the drill due to processing heat so that excessive load may be applied to the drill to halt the processing apparatus. As mentioned above, heat accumulation at the time of drilling work is likely to cause problems associated with the quality of processed holes. Under these circumstances, for example, the production of structures using titanium alloy materials for aircrafts particularly requires high quality drilling work. Thus, it is very important to solve the problems associated with burrs as described above.

In order to prevent such heat accumulation on a processing site and a drill, wet work using a cutting oil or the like has heretofore been performed. However, the wet work requires a washing step at the completion of cutting work. If an oil remains around or inside processed holes, there is the possibility that a screw serving as a fastener for fastening at through-holes is deteriorated or a fastening portion is loosened. These problems might lead to a deadly accident.

In this respect, as described in Patent Literature 2, improvement in the workability of metals, for which cutting work is difficult, has been studied in terms of cutting tools or cutting work methods, but has produced insufficient effects.

Conventional processing methods are more likely to cause the abrasion of a drill with increase in the diameters of holes and the diameter of a drill bit used, as compared with the drilling work of small holes. Unfortunately, this facilitates causing burrs, chippings, or splintering at the entrance portion or the exit portion of drill penetration (hereinafter, these portions are also collectively referred to as the "periphery of a cut portion"). This is because a larger diameter of a drill bit increases the volume of a workpiece material to be removed by cutting work and increases load to the drill bit.

Moreover, conventional processing methods are more likely to cause the abrasion of a cutting tool with increase in the thickness of a workpiece material, as compared with the processing of a workpiece material having a small thickness. Unfortunately, this facilitates causing burrs, chippings, or splintering at the entrance portion or the exit portion of cutting tool penetration (hereinafter, these portions are also collectively referred to as the "periphery of a cut portion"). This is because a larger thickness of a workpiece material increases the volume of the workpiece material to be removed by cutting work and increases load to a cutting tool.

The present invention has been made in light of the problems described above, and an object of the present invention is to provide a material for built up edge formation which can reduce the abrasion of the cutting edge of a cutting tool in the cutting work of a workpiece material (particularly, a difficult-to-cut material), and a built up edge formation method using the material for built up edge formation. The "difficult-to-cut material" refers to a fiber reinforced composite material, a difficult-to-cut metal material, or a composite material of the fiber reinforced composite material and the difficult-to-cut metal material.

The present inventors have conducted diligent studies to attain the object. As a result, the present inventors have completed the present invention by finding that the object can be attained by a material for built up edge formation comprising a resin block containing a high molecular weight compound (A), a medium molecular weight compound (B), and a carbon (C) having a predetermined average particle size.

Specifically, the present invention is as follows:

[1]
A material for built up edge formation, having a resin block containing:
a high molecular weight compound (A) having a weight average molecular weight of $5\times10^4$ or higher and $1\times10^6$ or lower;
a medium molecular weight compound (B) having a weight average molecular weight of $1\times10^3$ or higher and lower than $5\times10^4$; and a carbon (C).

[2]
The material for built up edge formation according to [1], wherein
the material for built up edge formation is used in a built up edge formation method comprising a built up edge formation step of forming a built up edge at the cutting edge of a cutting tool by cutting the material for built up edge formation with the cutting tool.

[3]
The material for built up edge formation according to [1] or [2], further comprising a difficult-to-cut block having a Vickers hardness of 300° or more below the resin block.

[4]
The material for built up edge formation according to any one of [1] to [3], wherein the difficult-to-cut block is a fiber reinforced composite material and/or a difficult-to-cut metal material.

[5]
The material for built up edge formation according to any one of [1] to [4], wherein
the high molecular weight compound (A) is a thermoplastic resin having a weight average molecular weight of $5\times10^4$ or higher and $1\times10^6$ or lower, and
the medium molecular weight compound (B) is a thermoplastic resin having a weight average molecular weight of $1\times10^3$ or higher and $2\times10^4$ or lower.

[6]
The material for built up edge formation according to any one of [1] to [5], wherein
a content of the high molecular weight compound (A) is 10 to 60 parts by mass with respect to 100 parts by mass in total of the high molecular weight compound (A), the medium molecular weight compound (B), and the carbon (C).

[7]
The material for built up edge formation according to any one of [1] to [6], wherein
a content of the medium molecular weight compound (B) is 10 to 75 parts by mass with respect to 100 parts by mass in total of the high molecular weight compound (A), the medium molecular weight compound (B), and the carbon (C).

[8]
The material for built up edge formation according to any one of [1] to [7], wherein a content of the carbon (C) is 5 to 70 parts by mass with respect to 100 parts by mass in total of the high molecular weight compound (A), the medium molecular weight compound (B), and the carbon (C).
[9]
The material for built up edge formation according to any one of [3] to [8], further having an adhesive layer below the difficult-to-cut block.
[10]
The material for built up edge formation according to [9], wherein the adhesive layer comprises an acrylic polymer.

A built up edge formation method, comprising
a built up edge formation step of forming a built up edge at the cutting edge of a cutting tool by cutting a material for built up edge formation with the cutting tool.
[12]
The built up edge formation method according to [11], wherein
the material for built up edge formation comprises
a resin block containing
a high molecular weight compound (A) having a weight average molecular weight of $5 \times 10^4$ or higher and $1 \times 10^6$ or lower,
a medium molecular weight compound (B) having a weight average molecular weight of $1 \times 10^3$ or higher and lower than $5 \times 10^4$, and
a carbon (C), and further comprises
a difficult-to-cut block having a Vickers hardness of 300° or more.
[13]
The built up edge formation method according to [11] or [12], wherein
the material for built up edge formation used is a material for built up edge formation according to any of [1] to [10].
[14]
The built up edge formation method according to any one of [11] to [13], wherein
in the built up edge formation step, the cutting tool is a drill, a router, an end mill, a face milling cutter, a turning tool, or a boring bar.
[15]
The built up edge formation method according to any one of [11] to [14], wherein
in the built up edge formation step, the number of rotations for rotating the cutting tool in the resin block is 100 rpm or more.
[16]
The built up edge formation method according to any one of [11] to [15], wherein
in the built up edge formation step, the rate at which the cutting tool comes into the resin block is 1 mm/min or more.
[17]
The built up edge formation method according to any one of [11] to [16], wherein
in the built up edge formation step, the retention time for which the cutting tool remains in the resin block is 1 second or longer.
[18]
A cutting tool comprising
a built up edge obtained from a material for built up edge formation according to any one of [1] to [10].
[19]
A cutting tool comprising
a built up edge obtained by a built up edge formation method according to any one of [11] to [17].

[20]
A cutting work method comprising
a cutting step of cutting a workpiece material using a cutting tool according to [18] or [19].

The present invention can provide a material for built up edge formation which can reduce the abrasion of the cutting edge of a cutting tool in the cutting work of a workpiece material (particularly, a difficult-to-cut material), and a built up edge formation method using the material for built up edge formation.

DESCRIPTION OF EMBODIMENTS

Figure 1:
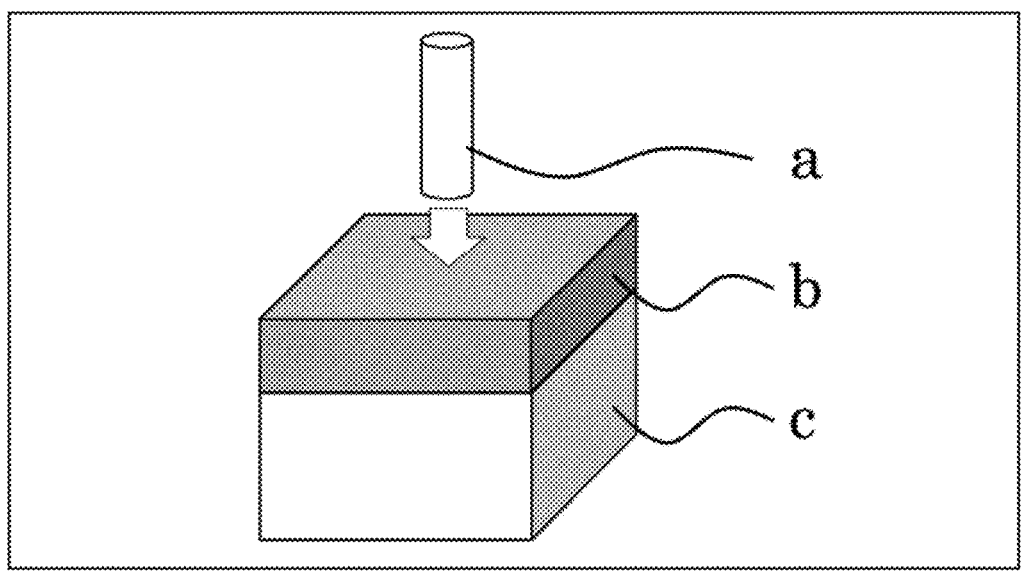
FIG. 1 shows a schematic diagram illustrating one embodiment of the built up edge formation method of the present embodiment.

Hereinafter, the mode for carrying out the present invention (hereinafter, referred to as the "present embodiment") will be described in detail. However, the present invention is not intended to be limited by the present embodiment, and various changes or modifications can be made without departing from the spirit of the present invention.
[Material for Built Up Edge Formation]
The material for built up edge formation of the present embodiment comprises a resin block containing a high molecular weight compound (A) having a weight average molecular weight of $5 \times 10^4$ or higher and $1 \times 10^6$ or lower, a medium molecular weight compound (B) having a weight average molecular weight of $1 \times 10^3$ or higher and lower than $5 \times 10^4$, and a carbon (C).
The material for built up edge formation of the present embodiment can be used in a built up edge formation method having a built up edge formation step of forming a built up edge at the cutting edge of a cutting tool by cutting the material for built up edge formation with the cutting tool.
FIG. 1 shows a schematic diagram illustrating an embodiment of use of the material for built up edge formation of the present embodiment. As shown in FIG. 1, the material for built up edge formation of the present embodiment comprises a resin block b and further comprises, if necessary, a difficult-to-cut block c having a Vickers hardness of 300° or more below the resin block b. The material for built up edge formation is subjected to cutting work using a cutting tool a from the resin block b side so that a built up edge is formed at the cutting edge of the cutting tool a exposed to a high temperature and a high pressure during the cutting work. The "built up edge" is some scrapings fixed to the cutting edge of a cutting tool due to a high pressure and temperature during cutting work and refers to a thin film-like or layer-like edge having a shape similar to that of the cutting edge. In general, when the cutting edge is rounded by the formation of the built up edge, there arise problems of decreased cutting ability, peeling off of a cutting surface, formation of narrow cracks, and a lack of gloss. Furthermore, there may arise problems of deteriorated dimensional accuracy resulting from the oscillation of the cutting edge in the incision direction due to the growth and drop of the built up edge. However, a significant feature of the built up edge formed using the material for built up edge formation of the present embodiment is that the built up edge can reduce the abrasion of the cutting edge of a cutting tool in the cutting work of a workpiece material (particularly, a difficult-to-cut material) and can prolong the lifespan of the cutting tool. As a result, cost required for cutting tools, the number of runs of a cutting tool change step, or the like can be reduced. Thus, cutting work excellent in productivity is also achieved. In this context, the "cutting work" is not particularly limited as long as the cutting work is a process to cut a workpiece material. Examples thereof include drilling work, grooving work, turning work, and parting work. Among them, the material for built up edge formation of the present embodiment is suitable for drilling work using a drill.

Hereinafter, the configuration of the material for built up edge formation of the present embodiment will be described in more detail.

[Resin Block]

The resin block contains a high molecular weight compound (A) having a weight average molecular weight of $5 \times 10^4$ or higher and $1 \times 10^6$ or lower, a medium molecular weight compound (B) having a weight average molecular weight of $1 \times 10^3$ or higher and lower than $5 \times 10^4$, and a carbon (C).

[High Molecular Weight Compound (A)]

The high molecular weight compound (A) can function as a lubricant agent and is capable of improving the lubricity of the material for built up edge formation and forming a built up edge without the abrasion of the cutting edge. The high molecular weight compound (A) can further function as a molding agent and improves the moldability of the material for built up edge formation.

The high molecular weight compound (A) is not particularly limited as long as its weight average molecular weight is $5 \times 10^4$ or higher and $1 \times 10^6$ or lower. Examples thereof include water soluble thermoplastic resins, non-water soluble thermoplastic resins, water soluble thermosetting resins, and non-water soluble thermosetting resins. Among them, a water soluble thermoplastic resin and/or a non-water soluble thermoplastic resin is preferred, and a water soluble thermoplastic resin is more preferred. Examples of the water soluble thermoplastic resin and the non-water soluble thermoplastic resin include, but are not particularly limited to, water soluble resins and non-water soluble resins described below. The "water soluble resin" refers to a high molecular compound that is dissolved in an amount of 1 g or larger with respect to 100 g of water at 25° C. at 1 atm. One high molecular weight compound (A) may be used alone, or two or more thereof may be used in combination.

Use of the water soluble resin tends to more effectively form a built up edge by the lubricity of the water soluble resin. Also, use of the water soluble resin moderately softens the surface hardness of the material for built up edge formation and therefore tends to be able to further reduce load to the cutting tool during built up edge formation. Examples of the water soluble thermoplastic resin include, but are not particularly limited to: polyalkylene oxide compounds such as polyethylene oxide, polypropylene oxide, and polyethylene oxide-propylene oxide copolymers; polyalkylene glycol compounds such as polyethylene glycol and polypropylene glycol; ester compounds of polyalkylene glycol; ether compounds of polyalkylene glycol; monostearate compounds of polyalkylene glycol, such as polyethylene glycol monostearate, polypropylene glycol monostearate, and polyglycerin monostearate; water soluble urethanes; water soluble polyether resins; water soluble polyesters; sodium poly(meth)acrylate; polyacrylamide; polyvinylpyrrolidone; polyvinyl alcohol; saccharides such as cellulose and derivatives thereof; and modified polyamide. Among them, polyethylene oxide, polyethylene glycol, and a water soluble polyether resin are preferred from the viewpoint described above.

Use of the non-water soluble resin tends to increase the surface hardness of the material for built up edge formation, as compared with use of the water soluble resin. This tends to improve the biting performance of the cutting edge of the cutting tool, for example, at the time of a built up edge formation step, further improve the rigidity of the material for built up edge formation, and improve handleability. Examples of the non-water soluble thermoplastic resin include, but are not particularly limited to: urethane polymers; acrylic polymers; vinyl acetate polymers; vinyl chloride polymers; polyester polymers; polystyrene resins exemplified by polyethylene wax, styrene homopolymers (GPPS), styrene-butadiene copolymers (HIPS), and styrene-(meth)acrylic acid copolymers (e.g., MS resin); and copolymers thereof.

The weight average molecular weight of the high molecular weight compound (A) is $5 \times 10^4$ or higher, preferably $6 \times 10^4$ or higher, more preferably $1 \times 10^5$ or higher, further preferably $1.25 \times 10^5$ or higher. Also, the weight average molecular weight of the high molecular weight compound (A) is $1 \times 10^6$ or lower, preferably $8 \times 10^5$ or lower, more preferably $7 \times 10^5$ or lower, further preferably $6 \times 10^5$ or lower. When the weight average molecular weight of the high molecular weight compound (A) is $5 \times 10^4$ or higher, the moldability tends to be improved. When the weight average molecular weight of the high molecular weight compound (A) is $1 \times 10^6$ or lower, the lubricity is further improved. In the case of using two or more high molecular weight compounds (A), it is preferred that the respective weight average molecular weights of these compounds should satisfy the weight average molecular weight described above. In the present embodiment, the weight average molecular weight can be measured by a method described in Examples (the same holds true for the description below).

The high molecular weight compound (A) may comprise a high molecular weight compound (A-1) having a weight average molecular weight of $3 \times 10^5$ or higher and $1 \times 10^6$ or lower and/or a high molecular weight compound (A-2) having a weight average molecular weight of $5 \times 10^4$ or higher and lower than $3 \times 10^5$, and preferably comprises both of the high molecular weight compound (A-1) and the high molecular weight compound (A-2). Combined use of the high molecular weight compound (A-1) and the high molecular weight compound (A-2) tends to further improve the moldability and the lubricity and be able to more effectively form a built up edge without the abrasion of the cutting edge.

The weight average molecular weight of the high molecular weight compound (A-1) is $3 \times 10^5$ or higher, preferably $4 \times 10^5$ or higher, more preferably $4.5 \times 10^5$ or higher, further preferably $5 \times 10^5$ or higher. Also, the weight average molecular weight of the high molecular weight compound (A-1) is $1 \times 10^6$ or lower, preferably $8 \times 10^5$ or lower, more preferably $7 \times 10^5$ or lower, further preferably $6 \times 10^5$ or lower.

The content of the high molecular weight compound (A-1) in the material for built up edge formation is preferably 5 parts by mass or larger, more preferably 10 parts by mass or larger, further preferably 15 parts by mass or larger, with respect to 100 parts by mass in total of the high molecular weight compound (A), the medium molecular weight compound (B), and the carbon (C). Also, the content of the high molecular weight compound (A-1) in the resin block is preferably 35 parts by mass or smaller, more preferably 30 parts by mass or smaller, further preferably 25 parts by mass or smaller, with respect to 100 parts by mass in total of the high molecular weight compound (A), the medium molecular weight compound (B), and the carbon (C). When the content of the high molecular weight compound (A-1) is 5 parts by mass or larger, the moldability tends to be further improved. When the content of the high molecular weight compound (A-1) is 35 parts by mass or smaller, there is a tendency to further improve the lubricity and be able to more effectively form a built up edge without the abrasion of the cutting edge.

The weight average molecular weight of the high molecular weight compound (A-2) is $5 \times 10^4$ or higher, preferably $6 \times 10^4$ or higher, more preferably $1 \times 10^5$ or higher, further preferably $1.25 \times 10^5$ or higher. Also, the weight average molecular weight of the high molecular weight compound (A-2) is lower than $3 \times 10^5$, preferably $2.5 \times 10^5$ or lower, more preferably $2 \times 10^5$ or lower.

The content of the high molecular weight compound (A-2) in the resin block is preferably 5 parts by mass or larger, more preferably 10 parts by mass or larger, further preferably 15 parts by mass or larger, with respect to 100 parts by mass in total of the high molecular weight compound (A), the medium molecular weight compound (B), and the carbon (C). Also, the content of the high molecular weight compound (A-2) in the resin block is preferably 35 parts by mass or smaller, more preferably 30 parts by mass or smaller, further preferably 25 parts by mass or smaller, with respect to 100 parts by mass in total of the high molecular weight compound (A), the medium molecular weight compound (B), and the carbon (C). When the content of the high molecular weight compound (A-2) is 5 parts by mass or larger, there is a tendency to further improve the lubricity and be able to more effectively form a built up edge without the abrasion of the cutting edge. When the content of the high molecular weight compound (A-2) is 35 parts by mass or smaller, the moldability tends to be further improved.

The content of the high molecular weight compound (A) in the resin block is preferably 10 parts by mass or larger, more preferably 20 parts by mass or larger, further preferably 25 parts by mass or larger, still further preferably 30 parts by mass or larger, with respect to 100 parts by mass in total of the high molecular weight compound (A), the medium molecular weight compound (B), and the carbon (C). Also, the content of the high molecular weight compound (A) in the resin block is preferably 60 parts by mass or smaller, more preferably 55 parts by mass or smaller, further preferably 50 parts by mass or smaller, with respect to 100 parts by mass in total of the high molecular weight compound (A), the medium molecular weight compound (B), and the carbon (C). When the content of the high molecular weight compound (A) is 10 parts by mass or larger, there is a tendency to further improve the lubricity and be able to more effectively form a built up edge without the abrasion of the cutting edge. When the content of the high molecular weight compound (A) is 10 parts by mass or larger, there is a tendency to improve the following properties and the tenacity and improve the cutting workability of a curved surface. When the content of the high molecular weight compound (A) is 65 parts by mass or smaller, the moldability tends to be further improved.

[Medium Molecular Weight Compound (B)]

The medium molecular weight compound (B) can function as a lubricant agent and is capable of improving the lubricity of the material for built up edge formation and forming a built up edge without the abrasion of the cutting edge.

The medium molecular weight compound (B) is not particularly limited as long as its weight average molecular weight is $1 \times 10^3$ or higher and lower than $5 \times 10^4$. Examples thereof include water soluble thermoplastic resins, non-water soluble thermoplastic resins, water soluble thermosetting resins, and non-water soluble thermosetting resins. Among them, a water soluble thermoplastic resin or a non-water soluble thermoplastic resin is preferred, and a water soluble thermoplastic resin is more preferred. For example, resins that are resins of the same types as in the water soluble resin and the non-water soluble resin described above and have a weight average molecular weight of $1 \times 10^3$ or higher and lower than $5 \times 10^4$ can be used as the water soluble thermoplastic resin and the non-water soluble thermoplastic resin. One medium molecular weight compound (B) may be used alone, or two or more thereof may be used in combination.

Examples of the medium molecular weight compound (B) include, but are not particularly limited to: polyalkylene glycol compounds such as polyethylene glycol, polypropylene glycol, and polytetramethylene glycol; monoether compounds of polyalkylene oxide, such as polyethylene oxide oleyl ether, polyethylene oxide cetyl ether, polyethylene oxide stearyl ether, polyethylene oxide lauryl ether, polyethylene oxide nonyl phenyl ether, and polyethylene oxide octyl phenyl ether; monostearate compounds of polyalkylene oxide, such as polyethylene oxide monostearate, polyethylene oxide sorbitan monostearate, and polyglycerin monostearate; and polyalkylene oxide compounds such as polyethylene oxide, polypropylene oxide, and polyethylene oxide-propylene oxide copolymers. Among them, polyethylene oxide monostearate is preferred. Use of such a medium molecular weight compound (B) tends to further improve the lubricity and be able to more effectively form a built up edge without the abrasion of the cutting edge.

The weight average molecular weight of the medium molecular weight compound (B) is $1 \times 10^3$ or higher, preferably $1.25 \times 10^3$ or higher, more preferably $1.5 \times 10^3$ or higher, further preferably $2 \times 10^3$ or higher, still further preferably $2.5 \times 10^3$ or higher, particularly preferably $3 \times 10^3$ or higher. Also, the weight average molecular weight of the medium molecular weight compound (B) is lower than $5 \times 10^4$, preferably $2.5 \times 10^4$ or lower, more preferably $2 \times 10^4$ or lower, further preferably $1 \times 10^4$ or lower, still further preferably $7.5 \times 10^3$ or lower, particularly preferably $5 \times 10^3$ or lower. When the weight average molecular weight of the medium molecular weight compound (B) is $1 \times 10^3$ or higher, the moldability is further improved. When the weight average molecular weight of the medium molecular weight compound (B) is lower than $5 \times 10^4$, there is a tendency to further improve the lubricity and be able to more effectively form a built up edge without the abrasion of the cutting edge.

The content of the medium molecular weight compound (B) in the resin block is preferably 10 parts by mass or larger, more preferably 20 parts by mass or larger, further preferably 30 parts by mass or larger, with respect to 100 parts by mass in total of the high molecular weight compound (A), the medium molecular weight compound (B), and the carbon (C). Also, the content of the medium molecular weight compound (B) in the resin block is preferably 75 parts by mass or smaller, more preferably 60 parts by mass or smaller, further preferably 45 parts by mass or smaller, still further preferably 40 parts by mass or smaller, with respect to 100 parts by mass in total of the high molecular weight compound (A), the medium molecular weight compound (B), and the carbon (C). When the content of the medium molecular weight compound (B) is 10 parts by mass or larger, there is a tendency to further improve the lubricity and be able to more effectively form a built up edge without the abrasion of the cutting edge. When the content of the medium molecular weight compound (B) is 75 parts by mass or smaller, the moldability tends to be further improved.

The high molecular weight compound (A) and the medium molecular weight compound (B), which differ in molecular weight, may also differ in their respective melt viscosities and melting points. By combined use of such a high molecular weight compound (A) and a medium molecular weight compound (B), although use of the high molecular weight compound (A) alone, for example, reduces the moldability or lubricity of the material for built up edge formation due to too high a viscosity or too high a melting point of the material for built up edge formation, this can be suppressed. In addition, although use of the medium molecular weight compound (B) alone reduces the moldability or lubricity of the material for built up edge formation due to too low a viscosity or too low a melting point of the material for built up edge formation, this can be suppressed.

Among those described above, a combination of the high molecular weight compound (A) which is a thermoplastic resin having a weight average molecular weight of $5 \times 10^4$ or higher and $1 \times 10^6$ or lower and the medium molecular weight compound (B) which is a thermoplastic resin having a weight average molecular weight of $1 \times 10^3$ or higher and $2 \times 10^4$ or lower is preferred.

[Carbon (C)]

The carbon (C) can function as a solid lubricant agent and is a component that improves the lubricity of the material for built up edge formation and forms a built up edge. The carbon (C) is not particularly limited. Examples thereof include natural graphite, artificial graphite, active carbon, acetylene black, carbon black, colloidal graphite, pyrolytic graphite, expanded graphite, and flake graphite. Among others, a carbon (C) whose shape is a flake shape is preferred. The carbon (C) whose shape is a flake shape tends to further improve the abrasion reducing performance. One carbon (C) may be used alone, or two or more thereof may be used in combination.

The average particle size of the carbon (C) is preferably 100 μm or larger, more preferably 125 μm or larger, further preferably 150 μm or larger, still further preferably 175 μm or larger, still further preferably 200 μm or larger, particularly preferably 225 μm or larger. Also, the average particle size of the carbon (C) is preferably 1000 μm or smaller, more preferably 750 μm or smaller, further preferably 500 μm or smaller, particularly preferably 300 μm or smaller. When the average particle size of the carbon (C) is 100 μm or larger, the lubricity and the moldability are further improved. When the average particle size of the carbon (C) is 1000 μm or smaller, there is a tendency to further reduce the abrasion of the cutting tool. In the case of comprising two or more carbons (C), it is preferred that the respective average particle sizes of the carbons (C) should satisfy the range described above.

In the present embodiment, the average particle size of the carbon (C) refers to a median size. The median size means a particle diameter that is obtained from the cumulative distribution curve (number based) of particle sizes and becomes 50% height in the curve (D50 value), and can be measured by a method described in Examples.

The content of the carbon (C) in the resin block is preferably 5 parts by mass or larger, more preferably 15 parts by mass or larger, further preferably 20 parts by mass or larger, still further preferably 25 parts by mass or larger, particularly preferably 30 parts by mass or larger, with respect to 100 parts by mass in total of the high molecular weight compound (A), the medium molecular weight compound (B), and the carbon (C). Also, the content of the carbon (C) in the resin block is preferably 70 parts by mass or smaller, more preferably 65 parts by mass or smaller, further preferably 60 parts by mass or smaller, with respect to 100 parts by mass in total of the high molecular weight compound (A), the medium molecular weight compound (B), and the carbon (C). When the content of the carbon (C) is 5 parts by mass or larger, the lubricity tends to be further improved. When the content of the carbon (C) is 70 parts by mass or smaller, the moldability tends to be further improved.

[Additional Component]

The material for built up edge formation of the present embodiment may optionally contain an additional component. Examples of the additional component include lubricity improving components, plasticizers, softening agents, surface conditioners, leveling agents, antistatic agents, emulsifiers, antifoaming agents, wax additives, coupling agents, rheology controlling agents, antiseptics, antifungal agents, antioxidants, light stabilizers, nucleating agents, organic fillers, inorganic fillers, solid lubricant agents, heat stabilizers, and colorants.

Examples of the lubricity improving components include, but are not particularly limited to: amide compounds exemplified by ethylenebisstearamide, oleic acid amide, stearic acid amide, and methylenebisstearamide; fatty acid compounds exemplified by lauric acid, stearic acid, palmitic acid, and oleic acid; fatty acid ester compounds typified by butyl stearate, butyl oleate, and glycol laurate; aliphatic hydrocarbon compounds typified by liquid paraffin; and higher aliphatic alcohols typified by oleyl alcohol. At least one of these lubricity improving components can be selected.

Examples of the solid lubricant agents other than the carbon (C) include, but are not particularly limited to, molybdenum disulfide, tungsten disulfide, molybdenum compounds, polytetrafluoroethylene, and polyimide.

The thickness of the resin block is preferably 0.05 cm or larger, more preferably 0.1 cm or larger, further preferably 0.2 cm or larger. The upper limit of the thickness of the resin block is not particularly limited and is preferably, for example, 5 cm or smaller.

[Difficult-to-Cut Block]

The difficult-to-cut block is not particularly limited as long as the block has a Vickers hardness of 300° or more. Examples thereof include a fiber reinforced composite material and/or a difficult-to-cut metal material. The difficult-to-cut block is positioned below the resin block and functions as a site that receives the cutting edge of the cutting tool that has penetrated the resin block. The cutting edge of the cutting tool that has come into the difficult-to-cut block is exposed to a higher temperature and a higher pressure. Thus, the built up edge can be formed, without the abrasion of the cutting edge, from the components supplied from the resin block. The "Vickers hardness" can be measured using a Vickers hardness meter.

The fiber reinforced composite material is not particularly limited as long as the composite material is made of a matrix resin and a reinforcing fiber. Examples of the matrix resin include, but are not particularly limited to: thermosetting resins such as epoxy resins, phenol resins, cyanate resins, vinyl ester resins, and unsaturated polyester resins; and thermoplastic resins such as ABS (acrylonitrile-butadiene-styrene) resins, PA (polyamide) resins, PP (polypropylene) resins, PC (polycarbonate) resins, methyl methacrylate resins, polyethylene, and acryl, and polyester resins. Examples of the reinforcing fiber include, but are not particularly limited to, glass fiber, carbon fiber, and aramid fiber. Examples of the form of the reinforcing fiber include, but are not particularly limited to, filaments, tows, cloths, blades, chops, milled fibers, felt mats, papers, and prepregs. Specific examples of such a fiber reinforced composite material include, but are not particularly limited to, fiber reinforced plastics (FRP) such as carbon fiber reinforced plastics (CFRP), glass fiber reinforced plastics (GFRP), and aramid fiber reinforced plastics (AFRP). Among them, a carbon fiber reinforced plastic (CFRP) relatively having large tensile strength and tensile elastic force and small density is preferred. The fiber reinforced composite material may optionally contain an additional component such as an inorganic filler or an organic filler. The fiber reinforced plastics (FRP) conceptually comprise a reinforcing fiber and a thermosetting resin and/or a thermoplastic resin. Among others, fiber reinforced composite materials comprising a reinforcing fiber and a thermoplastic resin are also referred to as FRTP (fiber reinforced thermoplastics). For example, fiber reinforced composite materials comprising carbon fiber and a thermoplastic resin are referred to as CFRTP (carbon fiber reinforced thermoplastics).

The difficult-to-cut metal material is not particularly limited as long as the difficult-to-cut metal material is a metal generally used as a structural material. Examples thereof include titanium alloy, aluminum alloy, magnesium alloy, low alloy steel, stainless steel, and heat resistant alloy. Among them, titanium alloy is preferred. The titanium alloy is particularly preferably Ti-6Al-4V which is composed of titanium, aluminum, and vanadium and has higher hardness. One difficult-to-cut metal material may be used alone, or two or more thereof may be used as a multilayer body.

The thickness of the difficult-to-cut block is preferably 0.3 cm or larger, more preferably 0.5 cm or larger, further preferably 1 cm or larger. The upper limit of the thickness of the difficult-to-cut block is not particularly limited and is preferably, for example, 3 cm or smaller.

[Adhesive Layer]

The material for built up edge formation of the present embodiment may have an adhesive layer below the difficult-to-cut block in order to fix the material for built up edge formation so as to be immovable during a built up edge formation step.

The component constituting the adhesive layer is not particularly limited and is, for example, a thermoplastic resin and/or a thermosetting resin. Examples of the thermoplastic resin include, but are not particularly limited to, urethane polymers, acrylic polymers, vinyl acetate polymers, vinyl chloride polymers, polyester polymers, and copolymers thereof. Examples of the thermosetting resin include, but are not particularly limited to, resins such as phenol resins, epoxy resins, melamine resins, urea resins, unsaturated polyester resins, alkyd resins, polyurethane, thermosetting polyimide, and cyanate resins. Among them, an acrylic polymer is preferred because of being capable of easily adhering at ordinary temperature. A solvent type acrylic pressure sensitive adhesive and an acrylic emulsion type pressure sensitive adhesive (aqueous) are more preferred.

The adhesive layer may optionally contain a degradation preventing agent such as an antioxidant, and an inorganic filler such as calcium carbonate, talc, or silica, as components of the adhesive layer.

The thickness of the adhesive layer is not particularly limited and is preferably 0.01 mm or larger, more preferably 0.05 mm or larger. Also, the thickness of the adhesive layer is preferably 5 mm or smaller, more preferably 2.5 mm or smaller.

[Method for Producing Material for Built Up Edge Formation]

The method for producing the material for built up edge formation of the present embodiment is not particularly limited, and a conventional method known in the art for molding a resin composition comprising a resin such as a polymer material, and a filler (e.g., an inorganic filler) into the form of a block can be widely used. Examples of such a production method include: a method which involves mixing the high molecular weight compound (A), the medium molecular weight compound (B), and the carbon (C) in the presence or absence of a solvent, applying the mixture to a support, solidifying the mixture by cooling to form a block, and then peeling off the support therefrom to obtain the material for built up edge formation; and a method which involves mixing the high molecular weight compound (A), the medium molecular weight compound (B), and the carbon (C) in the presence or absence of a solvent, extrusion molding the mixture into a block shape, and cutting the block, if necessary, to obtain the material for built up edge formation.

When the material for built up edge formation is a multilayer body with the difficult-to-cut block mentioned above, examples of the method for producing the multilayer body include, but are not particularly limited to, a method which involves pressure bonding the resin block to the difficult-to-cut block. The method for forming an adhesive layer on the surface of the difficult-to-cut block in the material for built up edge formation is not particularly limited as long as the method is known in the art and industrially used. Specific examples thereof include: a method which involves forming the adhesive layer by a roll method, a curtain coating method, a spraying method, or the like; and a method which involves forming in advance the adhesive layer having the desired thickness using a roll, a T-die extruder, or the like. The thickness of the adhesive layer is not particularly limited, and the optimum thickness can be appropriately selected according to the curvature of the workpiece material and the configuration of the material for built up edge formation.

[Built Up Edge Formation Method]

The built up edge formation method of the present embodiment has a built up edge formation step of forming a built up edge at the cutting edge of a cutting tool by cutting a material for built up edge formation with the cutting tool. When the material for built up edge formation has a difficult-to-cut block, it is preferred that the cutting edge of the cutting tool should come into the member from the resin block side.

In the built up edge formation step, the number of rotations of the tool to come into the material for built up edge formation, the cutting rate, the material of the tool, the type of coating on the tool surface, and the shape of the tool are not particularly limited. Hereinafter, one example of built up edge formation conditions will be described.

In the built up edge formation step, the number of rotations of the cutting tool to come into the material for built up edge formation is not particularly limited and is preferably 100 rpm or more and 10,000 rpm or less, more preferably 200 rpm or more and 8,000 rpm or less. Also, the number of rotations of the cutting tool is preferably 200 rpm or more and 5,000 rpm or less. When the number of rotations of the cutting tool is 100 rpm or more, the built up edge formation tends to be promoted because the cutting edge of the cutting tool is exposed to an environment of a temperature and a pressure that facilitate forming the built up edge.

In the built up edge formation step, the cutting rate at which the cutting tool comes into the material for built up edge formation is not particularly limited and is preferably 1 mm/min or more and 100 mm/min or less, more preferably 1 mm/min or more and 50 mm/min or less. Also, the cutting rate of the cutting tool is preferably 1 mm/min or more and 10 mm/min or less.

In the built up edge formation step, the material of the cutting tool is not particularly limited. Specific examples thereof include steel, aluminum, stainless, high speed stainless comprising tungsten, and cemented carbides comprising tungsten carbide and cobalt.

In the built up edge formation step, the presence or absence or type of coating for the surface treatment of the cutting tool is not particularly limited. Specific examples of the type of the coating include diamond coating, diamond like coating, titanium carbide, titanium nitride, and aluminum oxide.

In the built up edge formation step, the type or shape of the cutting tool is not particularly limited. Specific examples thereof include drills, routers, end mills, face milling cutters, turning tools, boring bars, electrodeposition tools, and rim saws.

The "cutting work" is not particularly limited as long as the cutting work is a process to cut a workpiece material. Examples thereof include drilling work, grooving work, turning work, and parting work. Among them, drilling work using a drill (hereinafter, also simply referred to as "drilling work") is preferred.

In the built up edge formation step, the retention time is preferably 1 second or longer, more preferably 15 seconds or longer, further preferably 30 seconds or longer. The upper limit of the retention time is not particularly limited and is preferably 10 minutes or shorter. When the retention time is 1 second or longer, the built up edge formation tends to be promoted because the cutting edge of the cutting tool is exposed for a longer time to an environment of a temperature and a pressure that facilitate forming the built up edge. In this context, the "retention time" refers to the time for which the cutting tool remains in the resin block. When a difficult-to-cut block is present, the retention time is the time for which the cutting tool remains in the resin block and the difficult-to-cut block.

[Cutting Tool]

The cutting tool of the present embodiment has a built up edge obtained from the material for built up edge formation described above. Such a cutting tool can be obtained by forming the built up edge by the built up edge formation method described above and can be a cutting tool having the built up edge obtained by the built up edge formation method.

[Cutting Work Method]

The cutting work method of the present embodiment has a cutting step of cutting a workpiece material using the cutting tool described above. In the cutting work step, a general cutting work technique can be used. Examples thereof include cutting work that is performed while a site under cutting work and/or the cutting tool is cooled using a gas or a liquid. Examples of the method for cooling a site under cutting work and/or the cutting tool using a gas include: a method which involves supplying a compressed gas to the site under cutting work and/or the cutting tool; and a method which involves supplying an ambient gas to the cutting work site and/or the cutting tool by aspirating the gas in the neighborhood of the site under cutting work and/or the cutting tool.

In addition, processing other than drilling can also be performed in the same way as above. A tool and a method for cutting work are not particularly limited. Specific examples thereof include drilling work to form through-holes or non-through holes using a drill as well as a router, a milling cutter, an end mill, a side cutter, or the like, and processing to cut off a workpiece material with a router, a pipe cutter, an end mill, a metal saw, or the like. Also, a coating film of titanium, diamond, diamond like carbon, or the like may be formed on the cutting edge of the cutting tool in order to enhance its hardness and thereby suppress the abrasion.

Examples of the workpiece material that is subject include, but are not particularly limited to, a fiber reinforced composite material, a difficult-to-cut metal material, and a composite material of the fiber reinforced composite material and the difficult-to-cut metal material.

The fiber reinforced composite material is not particularly limited as long as the composite material is made of a matrix resin and a reinforcing fiber. Examples of the matrix resin include, but are not particularly limited to: thermosetting resins such as epoxy resins, phenol resins, cyanate resins, vinyl ester resins, and unsaturated polyester resins; and thermoplastic resins such as ABS (acrylonitrile-butadiene-styrene) resins, PA (polyamide) resins, PP (polypropylene) resins, PC (polycarbonate) resins, methyl methacrylate resins, polyethylene, and acryl, and polyester resins. Examples of the reinforcing fiber include, but are not particularly limited to, glass fiber, carbon fiber, and aramid fiber. Examples of the form of the reinforcing fiber include, but are not particularly limited to, filaments, tows, cloths, blades, chops, milled fibers, felt mats, papers, and prepregs. Specific examples of such a fiber reinforced composite material include, but are not particularly limited to, fiber reinforced plastics (FRP) such as carbon fiber reinforced plastics (CFRP), glass fiber reinforced plastics (GFRP), and aramid fiber reinforced plastics (AFRP). Among them, a carbon fiber reinforced plastic (CFRP) relatively having large tensile strength and tensile elastic force and small density is preferred. The fiber reinforced composite material may optionally contain an additional component such as an inorganic filler or an organic filler. The fiber reinforced plastics (FRP) conceptually comprise a reinforcing fiber and a thermosetting resin and/or a thermoplastic resin. Among others, fiber reinforced composite materials comprising a reinforcing fiber and a thermoplastic resin are also referred to as FRTP (fiber reinforced thermoplastics). For example, fiber reinforced composite materials comprising carbon fiber and a thermoplastic resin are referred to as CFRTP (carbon fiber reinforced thermoplastics).

The difficult-to-cut metal material is not particularly limited as long as the difficult-to-cut metal material is a metal generally used as a structural material. Examples thereof include titanium alloy, aluminum alloy, magnesium alloy, low alloy steel, stainless steel, and heat resistant alloy. Among them, titanium alloy is preferred. The titanium alloy is particularly preferably Ti-6Al-4V which is composed of titanium, aluminum, and vanadium and has higher hardness. The titanium alloy is a material that has tensile strength two times stronger than that of aluminum alloy and is also excellent in corrosion resistance and heat resistance. This difficult-to-cut material having high hardness requires special cutting work conditions or a cutting tool having a special shape for conventional techniques. However, use of the cutting tool of the present embodiment eliminates the need of special cutting work conditions or a cutting tool having a special shape and can further prolong the lifespan of the cutting tool. In terms of an intended purpose, a metal material for use in, for example, materials for the bodywork structures of aircrafts is preferred. The effect of prolonging the lifespan of the cutting tool by use of the cutting tool of the present embodiment becomes more apparent for a metal having higher strength. One difficult-to-cut metal material may be used alone, or two or more thereof may be used as a multilayer body.

Examples of the composite material of the fiber reinforced composite material and the difficult-to-cut metal material include, but are not particularly limited to, a material prepared as a composite from the fiber reinforced composite material and the difficult-to-cut metal material described above by lamination or the like. Usually, the fiber reinforced composite material and the difficult-to-cut metal material differ largely in optimum cutting conditions. Low speed feed at high speed rotation is suitable for the fiber reinforced composite material, whereas high speed feed at low speed rotation is suitable for the difficult-to-cut metal material. This is because, for example, for the drilling work of the difficult-to-cut metal material, a rise in the temperature of the drill is suppressed and the abrasion of the drill bit is suppressed. Particularly, a heat labile diamond coated drill requires such drilling conditions. In response to these conflicting drilling conditions, drilling conditions are changed between CFRP and titanium alloy, or drilling work is practiced under the same reasonable conditions, in actual processing sites. Alternatively, in the case of performing, for example, drilling work, a cutting oil is injected during the drilling work of titanium alloy intended for aircrafts, or an approach of collecting dust with a dust collector while spraying cold air is performed, in order to prevent a rise in the temperature of the drill. However, use of the cutting tool of the present embodiment is secondarily effective for greatly relaxing restrictions on drilling conditions for the difficult-to-cut metal material which easily generates heat due to the heat of friction.

EXAMPLES

Hereinafter, the present invention will be specifically described with reference to Examples and Comparative Examples. Examples described below are given merely for illustrating one example of the embodiment of the present invention. The present invention is not intended to be limited by these examples.

Table 1 shows the specifications of each component used in the production of a material for built up edge formation, an adhesive layer, a base material, a router bit used in cutting work, and a cutting work instrument.

TABLE 1

| Category | Notation in table | Name | Trade name/model | Manufacturer | Remarks |
|---|---|---|---|---|---|
| Base material | GFRP | Glass fiber reinforced plastic plate | G-10 | Risho Kogyo Co., Ltd. | Thickness: 20 mm |
|  | CFRP | Carbon fiber reinforced plastic plate | — | Ibaraki Kogyo K.K. | Thickness: 20 mm |
|  | Aluminum plate | Material for aircraft, aluminum plate | — | — | Thickness: 20 mm |
| High molecular weight compound (A) | A-1 | Polyethylene oxide | Alkox E-45 | Meisei Chemical Works, Ltd. | $Mw = 5.6 \times 10^5$ |
|  | A-2 | Polyethylene oxide | Alkox R-150 | Meisei Chemical Works, Ltd. | $Mw = 1.5 \times 10^5$ |
| Medium molecular weight compound (B) | B-1 | Polyethylene monostearate | Nonion S-40 | NOF Corp. | $Mw = 3.5 \times 10^3$ |
| Carbon (C) | C-1 | Carbon (graphite) | XD100 | Ito Graphite Co., Ltd. | Flake shape, average particle size = 250 μm |
| Adhesive layer | — | Double faced tape | No. 5612 | Nitto Denko Corp. | Base material: polyester film One face: strongly adhesive face, acrylic pressure sensitive adhesive Another face: weakly adhesive face, acrylic pressure sensitive adhesive Thickness: 0.12 mm |
| Router bit | — | Diamond profiling router bit | DCE 8-BE | OSG Corp. | Direction of twist: Right hand Diameter: 8 mm Length of cutting tooth: 30 mm Not coated |
| Cutting work instrument | — | Machining center | VCN-535C | Yamazaki Mazak Corp. | — |
| Workpiece material | CFRP plate | Carbon fiber reinforced plastic plate | — | — | General purpose grade cloth material Thickness: 4 mm |

For the average particle size (median size) of the carbon (C), the carbon was dispersed in a solution consisting of a hexametaphosphoric acid solution and a few drops of triton, and the respective maximum lengths of projected carbon particles were measured using a laser diffraction particle size distribution analyzer. Then, the cumulative distribution curve (number based) of particle sizes was calculated. A particle diameter that became 50% height in the cumulative distribution curve (number based) was used as the average particle size.

The weight average molecular weights of the high molecular weight compound (A) and the medium molecular weight compound (B) were calculated as relative average molecular weights by dissolving or dispersing each of the high molecular weight compound (A) and the medium molecular weight compound (B) in a 0.05% salt solution, followed by measurement by liquid chromatography involving GPC (gel permeation chromatography) columns with polyethylene glycol as standards.

[Method for Producing Material for Built Up Edge Formation]

Multilayer bodies a to e were produced as members for built up edge formation according to the resin composition of a resin block, the type of a base material used as a difficult-to-cut block, and the configuration as shown in Table 2. Hereinafter, the method for producing each multilayer body will be described.

Multilayer Body a 10 parts by mass of polyethylene oxide (Alkox E-45 manufactured by Meisei Chemical Works, Ltd.) and 20 parts by mass of polyethylene oxide (Alkox R-150 manufactured by Meisei Chemical Works, Ltd.) as the high molecular weight compound (A), 30 parts by mass of polyethylene oxide monostearate (Nonion S-40 manufactured by NOF Corp.) as the medium molecular weight compound (B), and 40 parts by mass of graphite (XD100 manufactured by Ito Graphite Co., Ltd.) as the carbon (C) were molded at a temperature of 140° C. using a single screw extruder to produce a sheet having a thickness of 1.0 mm. Ten sheets thus obtained were layered and pressed at 80° C. for 30 seconds to obtain a block having a thickness of 10 mm. The strongly adhesive face of a double faced tape having a thickness of 0.12 mm (No. 5612, manufactured by Nitto Denko Corp.) was affixed to one side of the block. The resultant was further affixed via the adhesive face of the block to one side of GFRP having a thickness of 20 mm (G-10, manufactured by Risho Kogyo Co., Ltd.) to obtain multilayer body a in which the block containing the resin composition was laminated with the base material GFRP.

Multilayer Body b 10 parts by mass of polyethylene oxide (Alkox E-45 manufactured by Meisei Chemical Works, Ltd.) and 20 parts by mass of polyethylene oxide (Alkox R-150 manufactured by Meisei Chemical Works, Ltd.) as the high molecular weight compound (A), 30 parts by mass of polyethylene oxide monostearate (Nonion S-40 manufactured by NOF Corp.) as the medium molecular weight compound (B), and 40 parts by mass of graphite (XD100 manufactured by Ito Graphite Co., Ltd.) as the carbon (C) were molded at a temperature of 140° C. using a single screw extruder to produce a sheet having a thickness of 1.0 mm. The strongly adhesive face of a double faced tape having a thickness of 0.12 mm (No. 5612, manufactured by Nitto Denko Corp.) was affixed to one side of the sheet. The resultant was further affixed via the adhesive face of the sheet to one side of CFRP having a thickness of 20 mm (manufactured by Ibaraki Kogyo K.K.) to obtain multilayer body b in which the block containing the resin composition was laminated with the base material CFRP.

Multilayer Body c 10 parts by mass of polyethylene oxide (Alkox E-45 manufactured by Meisei Chemical Works, Ltd.) and 20 parts by mass of polyethylene oxide (Alkox R-150 manufactured by Meisei Chemical Works, Ltd.) as the high molecular weight compound (A), 30 parts by mass of polyethylene oxide monostearate (Nonion S-40 manufactured by NOF Corp.) as the medium molecular weight compound (B), and 40 parts by mass of graphite (XD100 manufactured by Ito Graphite Co., Ltd.) as the carbon (C) were molded at a temperature of 140° C. using a single screw extruder to produce a sheet having a thickness of 1.0 mm. The strongly adhesive face of a double faced tape having a thickness of 0.12 mm (No. 5612, manufactured by Nitto Denko Corp.) was affixed to one side of the sheet. The resultant was further affixed via the adhesive face of the sheet to one side of CFRP having a thickness of 20 mm (manufactured by Ibaraki Kogyo K.K.) to obtain multilayer body c in which the block containing the resin composition was laminated with the base material CFRP.

Multilayer Body d 10 parts by mass of polyethylene oxide (Alkox E-45 manufactured by Meisei Chemical Works, Ltd.) and 20 parts by mass of polyethylene oxide (Alkox R-150 manufactured by Meisei Chemical Works, Ltd.) as the high molecular weight compound (A), 30 parts by mass of polyethylene oxide monostearate (Nonion S-40 manufactured by NOF Corp.) as the medium molecular weight compound (B), and 40 parts by mass of graphite (XD100 manufactured by Ito Graphite Co., Ltd.) as the carbon (C) were molded at a temperature of 140° C. using a single screw extruder to produce a sheet having a thickness of 1.0 mm. Ten sheets thus obtained were layered and pressed at 80° C. for 30 seconds to obtain a block having a thickness of 10 mm. The strongly adhesive face of a double faced tape having a thickness of 0.12 mm (No. 5612, manufactured by Nitto Denko Corp.) was affixed to one side of the block. The resultant was further affixed via the adhesive face of the sheet to one side of CFRP having a thickness of 20 mm (manufactured by Ibaraki Kogyo K.K.) to obtain multilayer body d in which the block containing the resin composition was laminated with the base material CFRP.

Multilayer Body e 10 parts by mass of polyethylene oxide (Alkox E-45 manufactured by Meisei Chemical Works, Ltd.) and 20 parts by mass of polyethylene oxide (Alkox R-150 manufactured by Meisei Chemical Works, Ltd.) as the high molecular weight compound (A), 30 parts by mass of polyethylene oxide monostearate (Nonion S-40 manufactured by NOF Corp.) as the medium molecular weight compound (B), and 40 parts by mass of graphite (XD100 manufactured by Ito Graphite Co., Ltd.) as the carbon (C) were molded at a temperature of 140° C. using a single screw extruder to produce a sheet having a thickness of 1.0 mm. Ten sheets thus obtained were layered and pressed at 80° C. for 30 seconds to obtain a block having a thickness of 10 mm. The strongly adhesive face of a double faced tape having a thickness of 0.12 mm (No. 5612, manufactured by Nitto Denko Corp.) was affixed to one side of the block. The resultant was further affixed via the adhesive face of the sheet to one side of an aluminum plate having a thickness of 20 mm (material for aircrafts, aluminum plate) to obtain multilayer body e in which the block containing the resin composition was laminated with the base material aluminum plate.

TABLE 2

| | Resin block | | | | | Adhesive layer | Difficult-to-cut block | |
|---|---|---|---|---|---|---|---|---|
| | | Composition | | | | | | |
| | | A-1 | A-2 | B-1 | C-1 | | | |
| Multilayer body name | Thickness mm | parts by mass | parts by mass | parts by mass | parts by mass | Type — | Thickness mm | Type — |
| Multilayer body a | 10 | 10 | 20 | 30 | 40 | No. 5612 | 20 | GFRP |
| Multilayer body b | 1 | 10 | 20 | 30 | 40 | No. 5612 | 20 | CFRP |
| Multilayer body c | 2 | 10 | 20 | 30 | 40 | No. 5612 | 20 | CFRP |
| Multilayer body d | 10 | 10 | 20 | 30 | 40 | No. 5612 | 20 | CFRP |
| Multilayer body e | 10 | 10 | 20 | 30 | 40 | No. 5612 | 20 | Aluminum |

Examples 1 to 10

Figure 2:
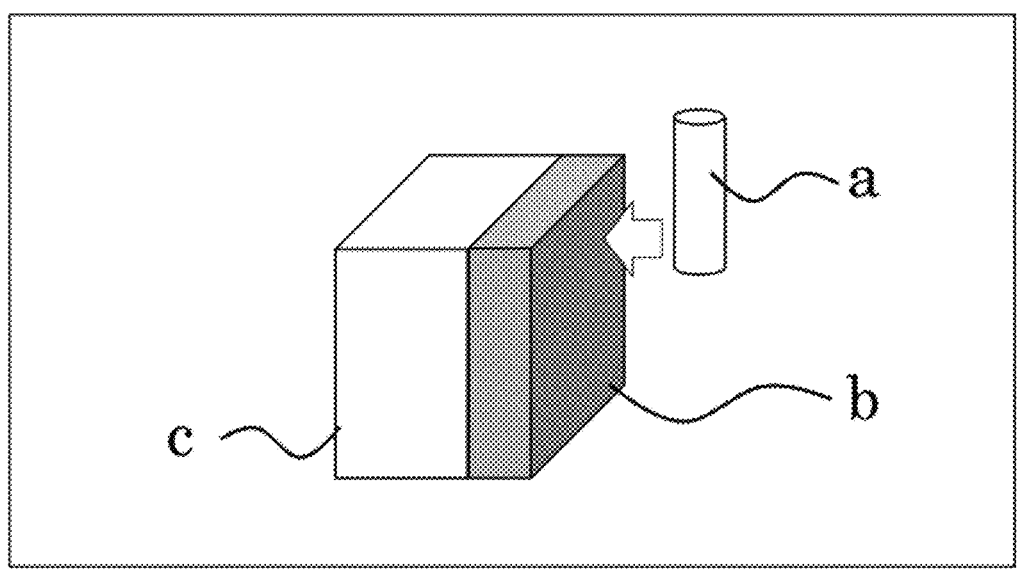
FIG. 2 shows a schematic diagram illustrating one embodiment of the built up edge formation method of the present embodiment.

In Examples 1 to 10, a built up edge was formed at the cutting edge of a tool under conditions shown in Table 3 using the produced multilayer bodies a to e. Examples 1 to 4 adopted, as shown in FIG. 1, the processing method in which the tool entered the multilayer body from the point of the tool. Examples 5 to 10 adopted, as shown in FIG. 2, the processing method in which the tool entered the multilayer body from the side of the tool. In either of the processing methods, the resin block of the multilayer body came in first contact with the tool. The cutting edge of the tool thus processed was observed to evaluate built up edge formation and chippings. The results are shown in Table 3.

Comparative Examples 1 to 3

In Comparative Examples 1 to 3, processing was performed in the same way as in Example 1 except that only a base material free from a resin block was used instead of the multilayer body. The cutting edge of the tool thus processed was observed to evaluate built up edge formation and chippings. The results are shown in Table 3.

[Evaluation: Built Up Edge Formation]

Figure 3:
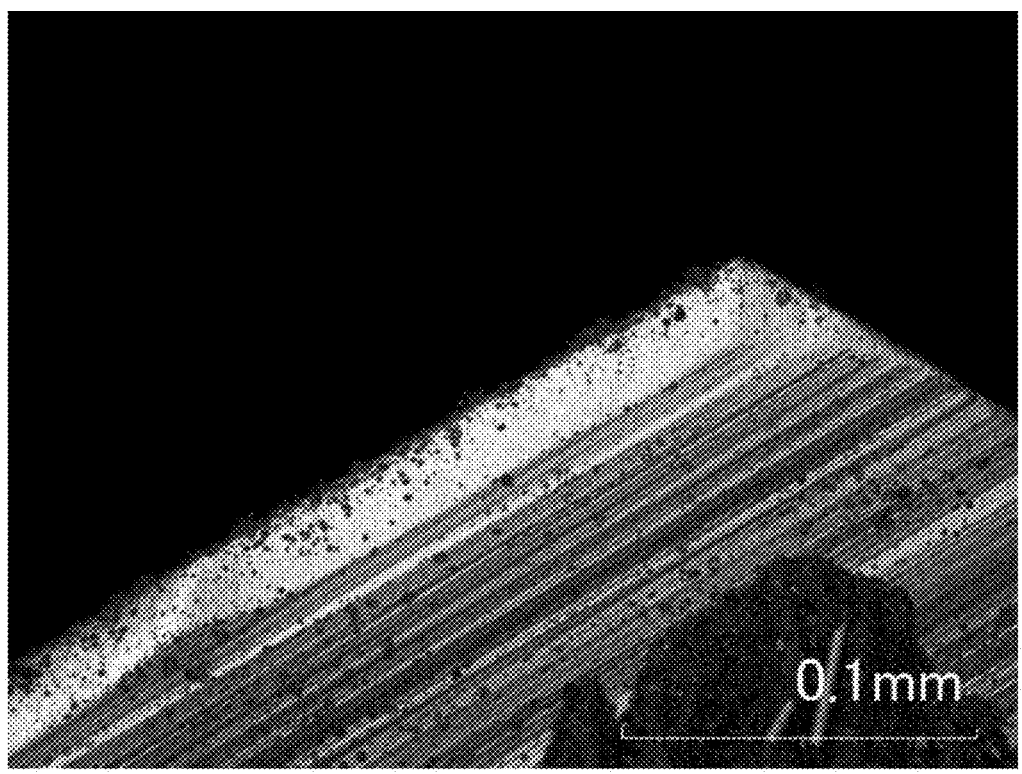
FIG. 3 shows a photograph of the cutting edge of a cutting tool observed at a magnification of ×500 under V-LASER microscope in Example 8.

In Examples and Comparative Examples, the cutting edge of the tool was observed under a microscope (V-LASER microscope VK-9700) to evaluate the state of built up edge formation. FIG. 3 shows a photograph of the cutting edge of the cutting tool observed at a magnification of ×500 under V-LASER microscope in Example 8.

[Evaluation: Chippings]

Figure 4:
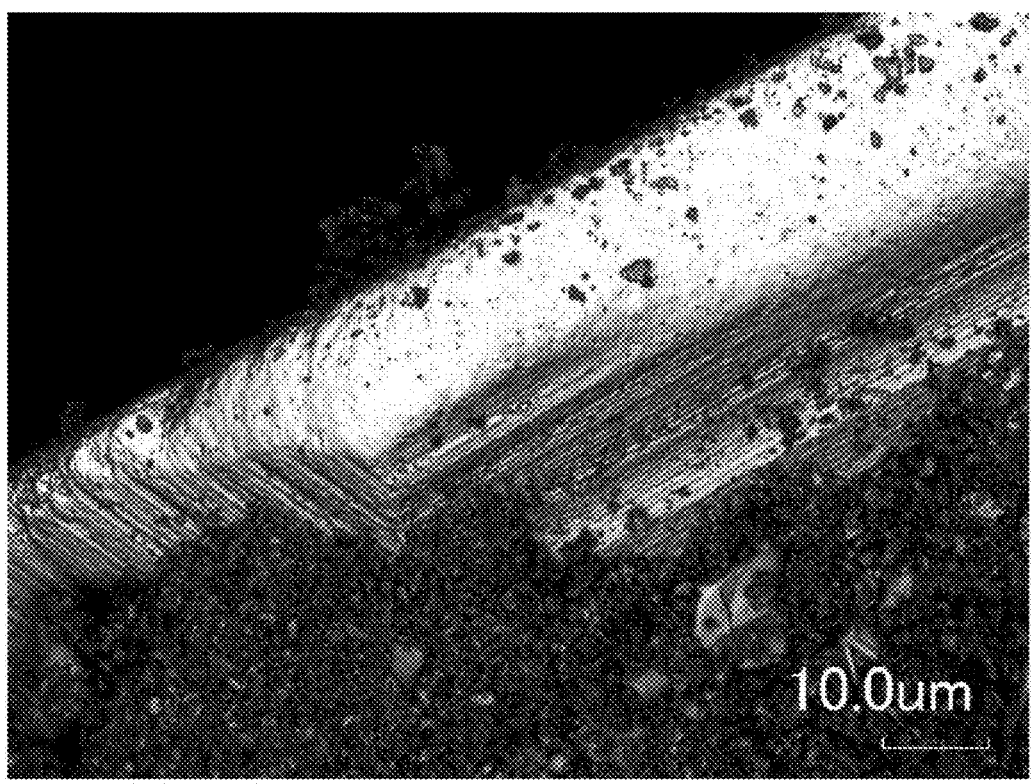
FIG. 4 shows a photograph of the cutting edge of a cutting tool observed at a magnification of ×1500 under V-LASER microscope in Example 8.

In Examples and Comparative Examples, the cutting edge of the tool was observed under a microscope (V-LASER microscope VK-9700) to evaluate the state of occurrence of chippings. FIG. 4 shows a photograph of the cutting edge of the cutting tool observed at a magnification of ×1500 under V-LASER microscope in Example 8.

TABLE 3

| | | | Built up edge formation conditions | | | | | Cutting edge state | |
|---|---|---|---|---|---|---|---|---|---|
| Category | Multilayer body — | Tool — | The number of rotations rpm | Feed rate mm/min | Retention time sec | Amount of incision in base material mm | Direction of processing of multilayer body — | Built up edge — | Chippings — |
| Example 1 | Multilayer body a | Diamond profiling router bit | 5,000 | 250 | 0 | 10 | Entry into multilayer body from point of tool | ++++ | +++ |
| Example 2 | Multilayer body a | Diamond profiling router bit | 5,000 | 250 | 30 | 10 | Entry into multilayer body from point of tool | ++++ | +++ |
| Example 3 | Multilayer body a | Diamond profiling router bit | 8,000 | 400 | 0 | 10 | Entry into multilayer body from point of tool | ++++ | ++++ |
| Example 4 | Multilayer body a | Diamond profiling router bit | 8,000 | 400 | 30 | 10 | Entry into multilayer body from point of tool | ++++ | ++++ |
| Example 5 | Multilayer body b | Diamond profiling router bit | 800 | 8 | 90 | 12 | Entry into multilayer body from point of tool | ++++ | ++++ |
| Example 6 | Multilayer body b | Diamond profiling router bit | 800 | 8 | 90 | 4 | Entry into multilayer body from point of tool | ++++ | ++++ |
| Example 7 | Multilayer body b | Diamond profiling router bit | 800 | 4 | 90 | 12 | Entry into multilayer body from point of tool | ++++ | ++++ |

TABLE 3-continued

| | | | Built up edge formation conditions | | | | | Cutting edge state | |
|---|---|---|---|---|---|---|---|---|---|
| Category | Multilayer body | Tool | The number of rotations rpm | Feed rate mm/min | Retention time sec | Amount of incision in base material mm | Direction of processing of multilayer body | Built up edge | Chippings |
| Example 8 | Multilayer body c | Diamond profiling router bit | 800 | 4 | 90 | 12 | Entry into multilayer body from point of tool | +++++ | ++++ |
| Example 9 | Multilayer body d | Diamond profiling router bit | 800 | 4 | 90 | 12 | Entry into multilayer body from point of tool | +++++ | ++++ |
| Example 10 | Multilayer body e | Diamond profiling router bit | 8,000 | 40 | 10 | 10 | Entry into multilayer body from point of tool | ++++ | +++ |
| Comparative Example 1 | GFRP | Diamond profiling router bit | 5,000 | 250 | 30 | 10 | Entry into multilayer body from point of tool | ++ | ++ |
| Comparative Example 2 | CFRP | Diamond profiling router bit | 800 | 4 | 90 | 12 | Entry into multilayer body from point of tool | ++ | ++ |
| Comparative Example 3 | Aluminum plate | Diamond profiling router bit | 800 | 4 | 90 | 12 | Entry into multilayer body from point of tool | ++ | + |

(Good)+++++-+(Poor)

Example 11

Next, a through groove formation process was performed using the tool with the formed built up edge produced in Example 8. A workpiece material was fixed to a machining center using a jig. The cutting work using the tool was performed under conditions involving use of CFRP having a thickness of 4 mm as the workpiece material and a processing distance of 5000 mm per tool to form a through groove having a width of 8 mm and a length of 5000 mm. Splintering of carbon fiber (hereinafter, also referred to as "CF") at the periphery of the through groove at the exist side of the tool, and occurrence of inner layer delamination of CFRP were evaluated. The results are shown in Table 4.

Comparative Examples 4 and 5

A through groove formation process was performed in the same way as in Example 1 except that the tool used in Comparative Example 2 or a fresh tool was used. A workpiece material was fixed to a machining center using a jig. The cutting work using the tool was performed under conditions involving use of CFRP having a thickness of 4 mm as the workpiece material and a processing distance of 5000 mm per tool to form a through groove having a width of 8 mm and a length of 5000 mm. Splintering of carbon fiber (hereinafter, also referred to as "CF") at the periphery of the through groove at the exist side of the tool, and occurrence of inner layer delamination of CFRP were evaluated. The results are shown in Table 4.

TABLE 4

| | | Cutting work conditions | | | | Quality of cutting site | |
|---|---|---|---|---|---|---|---|
| Category | Tool | Workpiece material | The number of rotations rpm | Cutting rate mm/min | Cutting distance mm | CF splintering | CF delamination |
| Example 11 | Tool produced in Example 8 | CFRP | 8,000 | 1,000 | 5,000 | ++++ | +++ |
| Comparative Example 4 | Tool produced in Comparative Example 2 | CFRP | 8,000 | 1,000 | 5,000 | ++ | ++ |
| Comparative Example 5 | Fresh tool | CFRP | 8,000 | 1,000 | 5,000 | ++ | ++ |

(Good) +++++-+ (Poor)

INDUSTRIAL APPLICABILITY

In the cutting work of a workpiece material, particularly, a difficult-to-cut material, the material for built up edge formation of the present invention has industrial applicability as a sheet that improves the processing quality thereof and reduces processing cost.

REFERENCE SIGNS LIST a: Cutting tool
b: Resin block
c: Difficult-to-cut block

The invention claimed is:

1. A material for built up edge formation, having a resin block containing:
   a high molecular weight compound (A) having a weight average molecular weight of $5 \times 10^4$ or higher and $1 \times 10^6$ or lower;
   a medium molecular weight compound (B) having a weight average molecular weight of $1 \times 10^3$ or higher and lower than $5 \times 10^4$; and
   a carbon (C),
   wherein the material for built up edge formation further comprises a difficult-to-cut block having a Vickers hardness of 300° or more below the resin block such that the material for built up edge formation forms a built up edge on a cutting tool prior to cutting a work.

2. The material for built up edge formation according to claim 1, wherein
   the material for built up edge formation is used in a built up edge formation method comprising a built up edge formation step of forming a built up edge at the cutting edge of a cutting tool by cutting the material for built up edge formation with the cutting tool.

3. The material for built up edge formation according to claim 1, wherein
   the difficult-to-cut block is a fiber reinforced composite material and/or a difficult-to-cut metal material.

4. The material for built up edge formation according to claim 1, wherein
   the high molecular weight compound (A) is a thermoplastic resin having a weight average molecular weight of $5 \times 10^4$ or higher and $1 \times 10^6$ or lower, and
   the medium molecular weight compound (B) is a thermoplastic resin having a weight average molecular weight of $1 \times 10^3$ or higher and $2 \times 10^4$ or lower.

5. The material for built up edge formation according to claim 1, wherein
   a content of the high molecular weight compound (A) is 10 to 60 parts by mass with respect to 100 parts by mass in total of the high molecular weight compound (A), the medium molecular weight compound (B), and the carbon (C).

6. The material for built up edge formation according to claim 1, wherein
   a content of the medium molecular weight compound (B) is 10 to 75 parts by mass with respect to 100 parts by mass in total of the high molecular weight compound (A), the medium molecular weight compound (B), and the carbon (C).

7. The material for built up edge formation according to claim 1, wherein
   a content of the carbon (C) is 5 to 70 parts by mass with respect to 100 parts by mass in total of the high molecular weight compound (A), the medium molecular weight compound (B), and the carbon (C).

8. The material for built up edge formation according to claim 1, further having
   an adhesive layer below the difficult-to-cut block.

9. The material for built up edge formation according to claim 8, wherein
   the adhesive layer comprises an acrylic polymer.

10. A cutting tool comprising
    a built up edge obtained from a material for built up edge formation according to claim 1.

11. A cutting work method comprising
    a cutting step of cutting a workpiece material using a cutting tool according to claim 10.

* * * * *